(12) United States Patent
Fecioru

(10) Patent No.: US 8,438,572 B2
(45) Date of Patent: May 7, 2013

(54) TASK SCHEDULING METHOD AND APPARATUS

(75) Inventor: Mihai-Daniel Fecioru, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 1078 days.

(21) Appl. No.: 12/282,489

(22) PCT Filed: Mar. 15, 2006

(86) PCT No.: PCT/EP2006/002362
§ 371 (c)(1),
(2), (4) Date: Sep. 10, 2008

(87) PCT Pub. No.: WO2007/104330
PCT Pub. Date: Sep. 20, 2007

(65) Prior Publication Data
US 2009/0031319 A1    Jan. 29, 2009

(51) Int. Cl.
*G06F 9/46* (2006.01)
(52) U.S. Cl.
USPC ............................ 718/103; 718/100; 718/102
(58) Field of Classification Search .................... None
See application file for complete search history.

(56) References Cited

U.S. PATENT DOCUMENTS

| | | | |
|---|---|---|---|
| 4,805,107 A * | 2/1989 | Kieckhafer et al. | 714/4.3 |
| 6,928,646 B1 * | 8/2005 | James et al. | 718/104 |
| 6,964,048 B1 | 11/2005 | Isham | |
| 7,694,302 B1 * | 4/2010 | Rajan et al. | 718/104 |
| 2002/0120663 A1 | 8/2002 | Binns | |
| 2004/0015973 A1 | 1/2004 | Skovira | |
| 2004/0216098 A1* | 10/2004 | Roe et al. | 717/161 |
| 2005/0015768 A1 | 1/2005 | Moore | |

FOREIGN PATENT DOCUMENTS

| | | |
|---|---|---|
| EP | 0527392 A | 2/1993 |
| EP | 1341084 B1 | 11/2005 |

OTHER PUBLICATIONS

Chung et al; "Algorithms for scheduling periodic jobs to minimize average error"; Real-Time Systems Symposium 1988.
Mok et al; "Window-constrained real-time periodic task scheduling"; 22nd IEEE Real-Time Symposium 2001.

\* cited by examiner

*Primary Examiner* — Kenneth Tang

(57) ABSTRACT

A method of scheduling execution of a plurality of tasks by a processor, the processor having a processor memory, the processor being arranged to load into the processor memory, during execution of a current task, data for a task that is scheduled for execution after the processor has completed the current task, the method comprising the steps of scheduling a next task for execution by the processor after the processor has completed a current task, and determining whether there is a high priority task to be executed by the processor, if there is a high priority task to be executed by the processor: determining whether the processor has begun loading the data for the next task into the processor memory, and if the processor has not begun loading the data for the next task into the processor memory, scheduling the high priority task, instead of the next task, for execution by the processor after the processor has completed the current task.

20 Claims, 8 Drawing Sheets

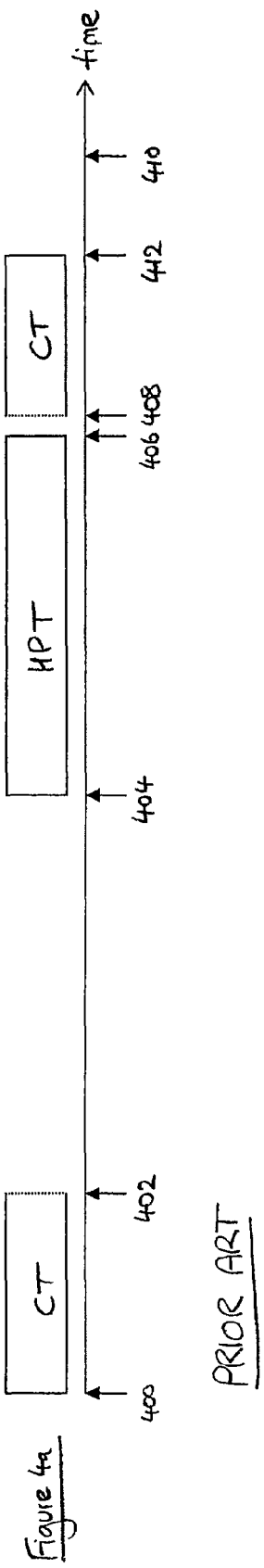
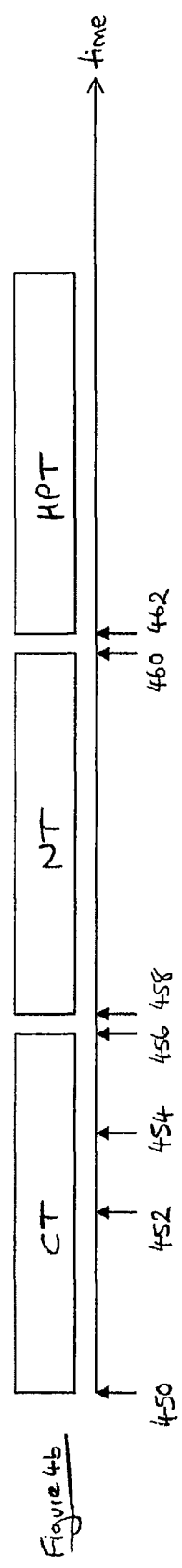
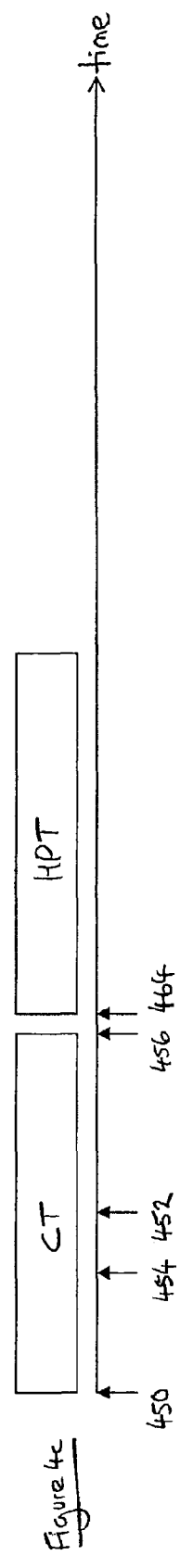
Figure 4a PRIOR ART
Figure 4b
Figure 4c

TASK SCHEDULING METHOD AND APPARATUS

FIELD OF THE INVENTION

The present invention relates to a method, apparatus and computer program for scheduling tasks for execution by a processor. The present invention also relates to a method, apparatus and computer program for executing tasks that have been so scheduled.

BACKGROUND OF THE INVENTION

It is known for processors to perform multi-tasking, in which a plurality of tasks appear to be executed by the processor at the same time. The processor does not actually execute the tasks at the same time—rather, it schedules the tasks for successive execution. The tasks have associated priorities and the scheduling is performed in accordance with these priorities such that a high priority task is to be executed before a low priority task. However, the current scheduling methods do not take into account the specific nature of the tasks that need to be executed, i.e. only generic task scheduling algorithms are used.

Media processing tasks (executing processing such as echo-cancelling, media encoding and data compression, or a series of such processing) often have soft real-time constraints, i.e. if the processing performed by such a media processing task is delayed or not performed at all, then this is not fatal to the task. This is due to the media processing tasks having an associated recovery mechanism—such as using a packet loss concealment algorithm when packets containing encoded media data are lost on a packet network or are not generated at all.

Additionally, media processing tasks often involve processing large amounts of data, storing large amounts of data in a processor memory and transferring large amounts of data between different processor memories. Indeed, it is often the case that the time taken to perform a media processing task can be as long as it takes to transfer the media task data into the processor's memory.

The current scheduling methods do not take these and other such features of media processing tasks into account. Therefore, the current scheduling methods are sub-optimal and may result in lower quality processed media data and/or fewer tasks being processed per unit time. It would therefore be desirable to be able to schedule such tasks in a more efficient manner.

SUMMARY OF THE INVENTION

According to an aspect of the invention, there is provided a method according to the accompanying claims.

According to another aspect of the invention, there is provided an apparatus according to the accompanying claims.

According to other aspects of the invention, there is provided a computer program, a storage medium and a transmission medium according to the accompanying claims.

Various other aspects of the invention are defined in the appended claims.

BRIEF DESCRIPTION OF THE DRAWINGS

Embodiments of the invention will now be described, by way of example only, with reference to the accompanying drawings, in which:

FIG. 4a schematically illustrates a pre-emptive scheduling method of the prior art;

FIGS. 4b and 4c schematically illustrate a non-pre-emptive scheduling method according to an embodiment of the invention;

DETAILED DESCRIPTION OF THE PREFERRED EMBODIMENTS

In the description that follows and in FIGS. 1-8, certain embodiments of the invention are described. However, it will be appreciated that the invention is not limited to the embodiments that are described and that some embodiments may not include all of the features that are described below.

Figure 1:
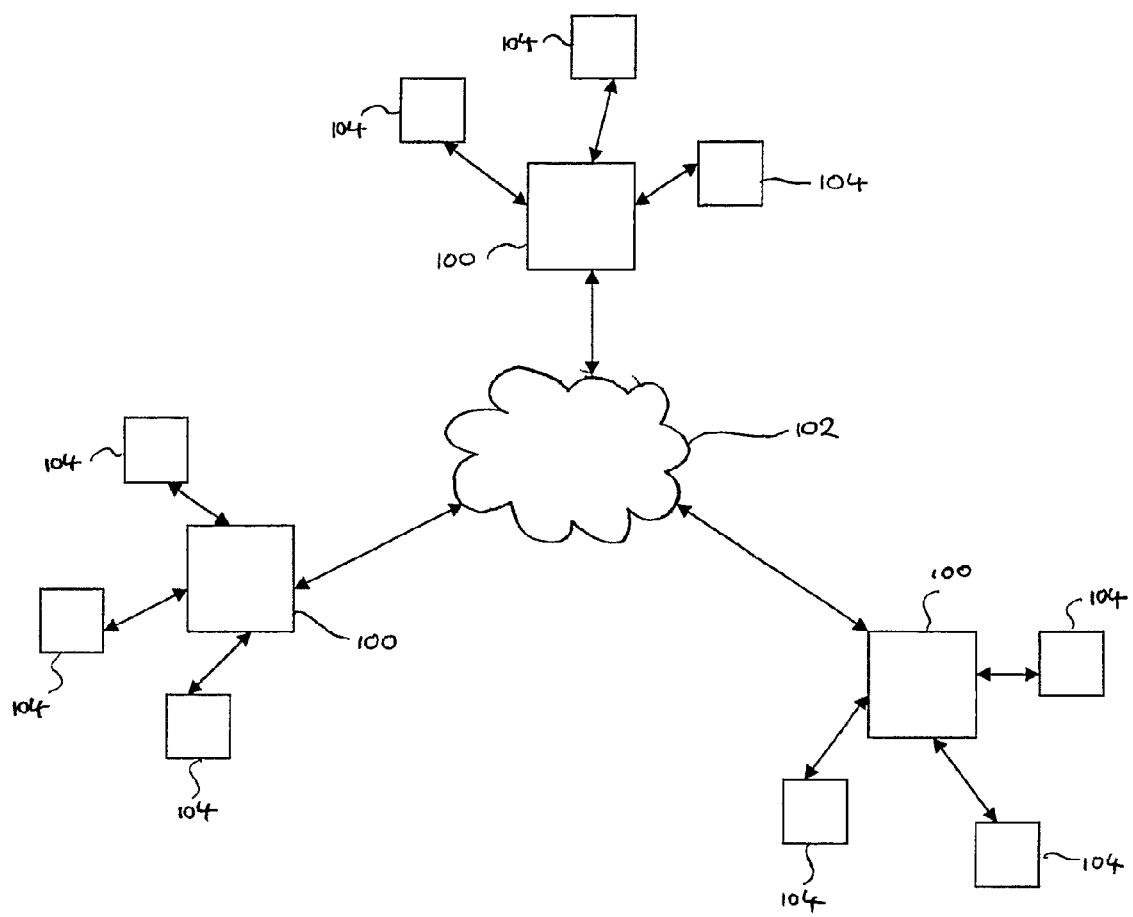
FIG. 1 schematically illustrates a communication system according to an embodiment of the invention.

FIG. 1 schematically illustrates a communication system according to an embodiment of the invention. A number of data processing apparatus 100 are connected to a network 102. The network 102 may be the Internet, a local area network, a wide area network, or any other network capable of transferring digital data. A number of users 104 communicate over the network 102 via the data processing apparatus 100. In this way, a number of communication paths exist between different users 104, as described below.

A user 104 communicates with a data processing apparatus 100, for example via analogue telephonic communication such as a telephone call, a modem communication or a facsimile transmission. The data processing apparatus 100 converts the analogue telephonic communication of the user 104 to digital data. This digital data is then transmitted over the network 102 to another one of the data processing apparatus 100. The receiving data processing apparatus 100 then converts the received digital data into a suitable telephonic output, such as a telephone call, a modem communication or a facsimile transmission. This output is delivered to a target recipient user 104. This communication between the user 104 who initiated the communication and the recipient user 104 constitutes a communication path.

As will be described in detail below, each data processing apparatus 100 performs a number of tasks (or functions) that enable this communication to be more efficient and of a higher quality. Multiple communication paths are established between different users 104 according to the requirements of the users 104, and the data processing apparatus 100 perform the tasks for the communication paths that they are involved in.

FIG. 1 shows three users 104 communicating directly with a data processing apparatus 100. However, it will be appreciated that a different number of users 104 may, at any one time, communicate with a data processing apparatus 100. Furthermore, a maximum number of users 104 that may, at any one time, communicate with a data processing apparatus 100, may be specified, although this may vary between the different data processing apparatus 100.

Figure 2:
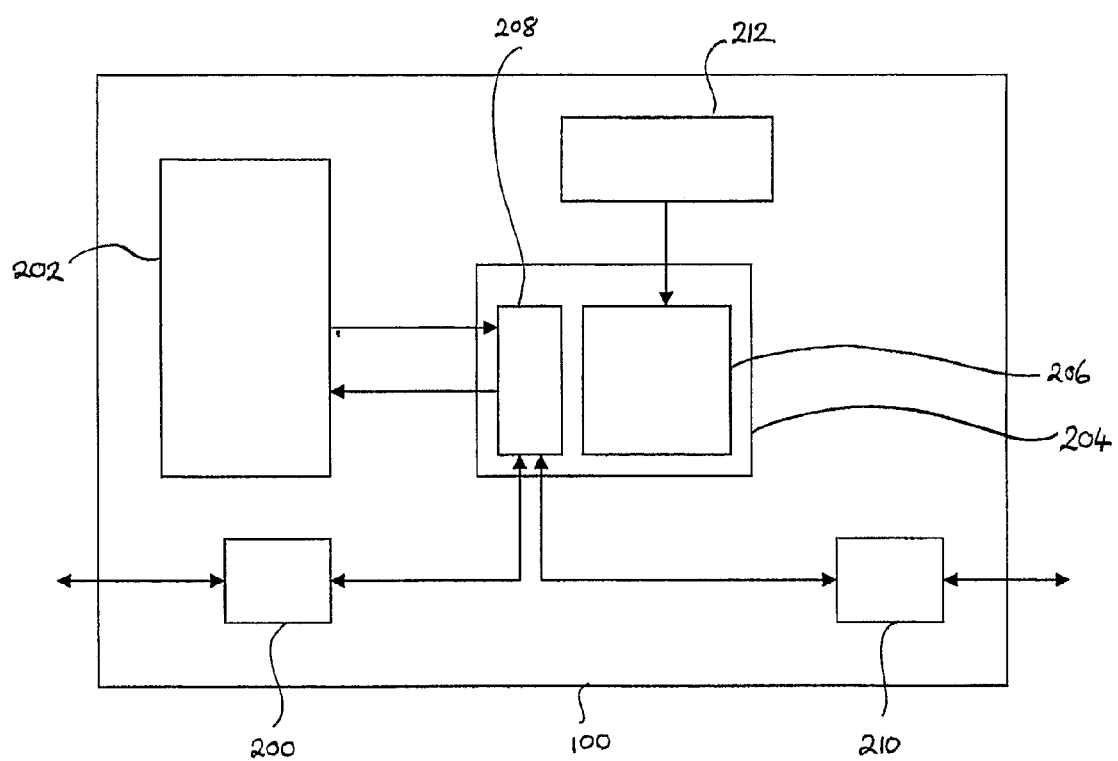
FIG. 2 schematically illustrates a data processing apparatus according to an embodiment of the invention.

FIG. 2 schematically illustrates the data processing apparatus 100 according to an embodiment of the invention.

The data processing apparatus 100 has an interface 200 for interfacing with a telephonic network, i.e. the interface 200 receives input data via a telephonic communication and outputs processed data as a telephonic communication. The data processing apparatus 100 also has an interface 210 for interfacing with the network 102 (which may be, for example, a packet network), i.e. the interface 210 may receive input digital data from the network 102 and may output digital data over the network 102. Each of the interfaces 200, 210 may receive input data and output processed data simultaneously. It will be appreciated that there may be multiple interfaces 200 and multiple interfaces 210 to accommodate multiple communication paths, each communication path having its own interfaces 200, 210.

It will be appreciated that the interfaces 200, 210 may perform various analogue-to-digital and digital-to-analogue conversions as is necessary to interface with the network 102 and a telephonic network.

The data processing apparatus 100 also has a processor 204 for performing various tasks (or functions) on the input data that has been received by the interfaces 200, 210. The processor 204 may be, for example, an embedded processor such as a MSC81x2 or a MSC71x processor supplied by Freescale Semiconductor Inc. The processor 204 has a central processing unit (CPU) 206 for performing the various tasks and an internal memory 208 for storing various task related data. Input data received at the interfaces 200, 210 is transferred to the internal memory 208, whilst data that has been processed by the processor 204 and that is ready for output is transferred from the internal memory 208 to the relevant interfaces 200, 210 (depending on whether the processed data is to be output over the network 102 or as a telephonic communication over a telephonic network).

The data processing apparatus 100 also has an external memory 202. This external memory 202 is referred to as an "external" memory to distinguish it from the internal memory 208 (or processor memory) of the processor 204.

The internal memory 208 may not be able to store as much data as the external memory 202 and the internal memory 208 usually lacks the capacity to store all of the data associated with all of the tasks that the processor 204 is to perform. Therefore, the processor 204 swaps (or transfers) data between the external memory 202 and the internal memory 208 as and when required. This will be described in more detail later.

Finally, the data processing apparatus 100 has a control module 212 for controlling the data processing apparatus 100. In particular, the control module 212 detects when a new communication path is established, for example: (i) by detecting when a user 104 initiates telephonic communication with the data processing apparatus 100; or (ii) by detecting when the data processing apparatus 100 receives the initial data for a newly established communication path from over the network 102. The control module 212 also detects when an existing communication path has been terminated, for example: (i) by detecting when a user 104 ends telephonic communication with the data processing apparatus 100; or (ii) by detecting when the data processing apparatus 100 stops receiving data for a current communication path from over the network 102.

When the control module 212 detects that a new communication path is to be established, it informs the processor 204 (for example, via a message) that a new communication path is to be established so that the processor 204 may commence an appropriate task to handle the new communication path. Similarly, when the control module 212 detects that a current communication path has been terminated, it informs the processor 204 (for example, via a message) of this fact so that the processor 204 may end any tasks associated with that communication path as appropriate.

The task performed by the processor 204 for a communication path carries out a number of processing functions. For example, (i) it receives input data from the interface 200, processes the input data, and outputs the processed data to the interface 210; and (ii) it receives input data from the interface 210, processes the input data, and outputs the processed data to the interface 200. The processing performed by a task on received input data for a communication path may include such processing as echo-cancellation, media encoding and data compression.

Figure 3:
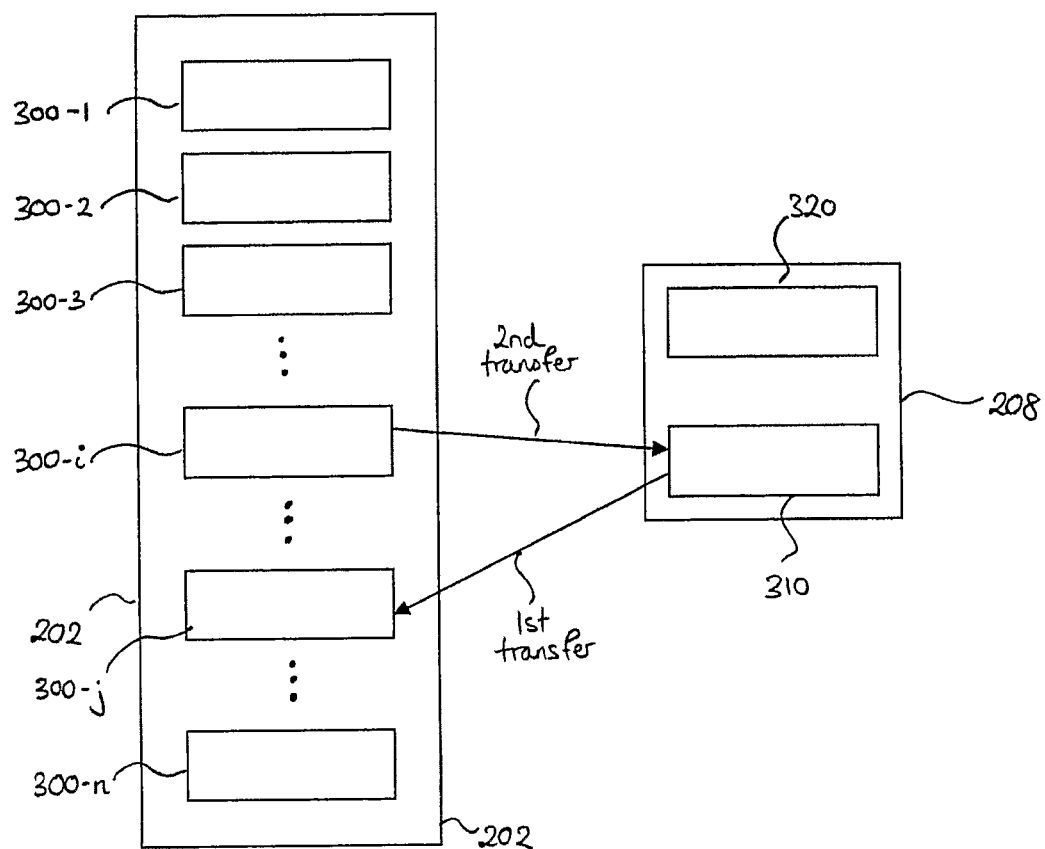
FIG. 3 schematically illustrates the relationship between an internal memory and an external memory of the data processing apparatus illustrated in FIG. 2.

FIG. 3 schematically illustrates the relationship between the internal memory 208 and the external memory 202.

The external memory 202 is partitioned to store data associated with each of the communication paths that the data processing apparatus 100 is currently handling. As shown in FIG. 3, data 300-1, 300-2, 300-3, 300-i, 300-j and 300-n, corresponding to a 1st, 2nd, 3rd, i-th, j-th and n-th communication path, are stored in the external memory 202. Each of the tasks that is performed by the processor 204 corresponds to a particular communication path. Therefore, each of the tasks has corresponding data 300 stored in the external memory 202.

Each of the data 300 may be, for example, the data corresponding to the most recent 200 ms of communication over the corresponding communication path, although it will be appreciated that other amounts of input data may be stored for each of the communication paths. Additionally, the data 300 may also include: (i) various other data related to the communication path, such as the current duration of the communication; or (ii) data related to any of the tasks that are to be, or have been, performed by the processor 204 for that communication path (such as flags and counters).

As mentioned, the number, n, of communication paths may vary over time in accordance with the communication needs of the users 104.

The internal memory 208 has two buffers 310, 320. One of these buffers 310, 320 stores, for the current task being executed by the processor 204, the data 300 associated with that current task. In FIG. 3, this buffer is the buffer 320. Therefore, in executing the current task, the processor 204 will process the data 300 being stored in the buffer 320.

At the beginning of execution of the current task, the other one of the buffers 310, 320 (in FIG. 3, this buffer is the buffer 310) stores the data 300 that was processed by processor 204 when executing the task preceding the current task. Therefore, whilst the current task is being executed by the processor 204, the data 300 stored in this other buffer 310 is transferred (or loaded) to the appropriate location in the external memory 202. In FIG. 3, the previous task was for the j-th communication path, and hence the data 300 stored in this other buffer 310 is transferred to the external memory 202 to overwrite the data 300-j currently being stored in the external memory 202 for the j-th communication path and to become the new (processed) data 300-j for the j-th communication path.

Once the transfer of the data 300 in the buffer 310 to the external memory 202 has been completed, the processor 204 determines which data 300 stored in the external memory 202 is associated with the task that is to be executed after the current task has been executed. In FIG. 3, the data 300 associated with the task that is to be executed after the current task has been executed is the data 300-*i* associated with the i-th communication path. Therefore, the processor 204 transfers (or loads) the data 300-*i* from the external memory 202 to the buffer 310 of the internal memory 208.

Thus, whilst the current task is being executed by the processor 204, a two-stage data transfer process is performed, namely: (i) the transfer of the processed data 300 associated with the previously executed task from the internal memory 208 to the external memory 202; and (ii) the transfer of the data 300 associated with the next task to be executed after the current task has been completed by the processor 204 from the external memory 202 to the internal memory 208. The second of these data transfers is performed after the first one, and the first one is commenced just before the processor 204 starts the execution of the current task. Preferred embodiments use a data transfer mechanism that allows these data transfers to be performed whilst the processor 204 executes tasks. For example, these data transfers may be made by a direct-memory-access (DMA) process if the data processing apparatus 100 supports such DMA transfers.

In this way, the limited capacity of the internal memory 208 of the processor 204 does not restrict the number of communication paths that can be handled by the data processing apparatus 100.

After the processor 204 has completed execution of the current task, the roles of the two buffers 310, 320 are reversed, i.e. the processor 204 begins execution of the next task using the data 300 stored in the buffer 310, whilst the two-stage data transfer process is performed between the external memory 202 and the buffer 320. In this way, the use of the buffers 310, 320 alternates between successive tasks performed by the processor 204.

It will be appreciated that, for the first of the data transfers of the two-stage data transfer process (i.e. the transfer of the processed data 300 associated with the previously executed task from the internal memory 208 to the external memory 202), the processor 204 may not transfer all of the data 300 stored in the buffer 310 to the external memory 202. For example, the external memory 202 may store the most recent 200 ms of input data for each of the communication paths that it is handling. However, a particular task may only alter the first 10 ms of input data for a communication path. Whilst the task may require all of the most recent 200 ms of input data of a communication path in order to perform its processing (and hence all of this 200 ms of input data will have been transferred from the external memory 202 to the internal memory 208), the task may only have altered the most recent 10 ms of data, and hence the processor 204 may transfer only that processed 10 ms of data back to the external memory 202. This reduces the time taken to perform the data transfers between the internal memory 208 and the external memory 202.

It will be appreciated that the organisation of the data 300 shown in FIG. 3 is merely exemplary and that other arrangements for storing the data 300 may be used.

The tasks that the processor 204 performs each have an associated priority, with a task of a high priority preferably being executed before a task of a low priority. Task priorities will be explained in more detail later. However, the scheduling of the tasks will now be described.

FIG. 4*a* schematically illustrates a pre-emptive scheduling method of the prior art. At a time 400, the processor 204 begins execution of a current task CT. Additionally, as the execution of the current task CT begins, the processor 204 begins the above-described two-stage data transfer process between the internal memory 208 and the external memory 202.

At a time 402 during execution of the current task CT, the processor 204 determines that a high priority task HPT needs to be executed. This could be, for example, as a result of the processor 204 detecting a software or hardware interrupt indicating that the high priority task HPT needs to be executed. Alternatively, this could be as a result of a high priority task HPT being initiated by another task that is being run by the processor 204. The high priority task HPT may be a task having a higher priority than the current task CT.

In accordance with the prior art pre-emptive scheduling, the two-stage data transfer process between the internal memory 208 and the external memory 202 is brought to an end. In particular, if the first data transfer (for transferring the processed data 300 of the previously executed task from the internal memory 208 to the external memory 202) is underway, then this data transfer is completed so that the processed data 300 resulting from the previously executed task is not lost. However, the second data transfer is not then commenced. Alternatively, if the first data transfer has been completed and the second data transfer (for transferring the data 300 of a next task NT from the external memory 202 to the internal memory 208) is underway, then this second data transfer is stopped.

Between the time 402 and a time 404, the data 300 stored in the external memory 202 that is associated with the high priority task HPT is transferred into the internal memory 208. During this period the CPU 206 stalls, i.e. does not perform any processing as it waits for all of the data 300 for the high priority task HPT to be loaded into the internal memory 208, so that the processor 204 may execute the high priority task HPT as soon as its associated data 300 has been transferred into the internal memory 208.

Once the data 300 for the high priority task HPT has been loaded into the internal memory 208 at the time 404, the processor 204 executes the high priority task HPT. Execution of the high priority task HPT ends at a time 406, following which, at a time 408, execution of the current task CT by the processor 204 is resumed.

At the time 408 when the current task CT is resumed, a two-stage data transfer process commences, i.e. the processed data 300 of the high priority task HPT is transferred from the internal memory 208 to the external memory 202, following which the data 300 associated with the next task NT is transferred from the external memory 202 to the internal memory 208. It is possible that this process may be completed at a time 410 after a time 412 at which the processor 204 completes the execution of the current task CT. Thus, between the time 412 and the time 410, the CPU 206 stalls again as it waits for the data 300 for the next task NT to be loaded into the internal memory 208.

These stalls of the CPU 206 reduce the efficiency and quality of the communication between the users 104. Additionally, these stalls reduce the total number of communication paths that can be handled by the data processing apparatus 100.

Therefore, in order to avoid potential stalls of the CPU 206, the processor 204 according to an embodiment of the invention uses a non-pre-emptive scheduling method which is schematically illustrated in FIGS. 4*b* and 4*c*. At a time 450, the processor 204 begins execution of a current task CT. Additionally, as the execution of the current task CT begins, the processor 204 begins a two-stage data transfer process between the internal memory 208 and the external memory 202. In particular at a time 452 during execution of the current task CT, the transfer of the processed data 300 of the previous task from the internal memory 208 to the external memory 202 has been completed and the transfer of the data 300 associated with a next task NT from the external memory 202 to the internal memory 208 commences.

At a time 454 during execution of the current task CT, the processor 204 determines that a high priority task HPT needs to be executed. This could be, for example, as a result of the processor 204 detecting a software or hardware interrupt indicating that the high priority task HPT needs to be executed. Alternatively, this could be as a result of a high priority task HPT being initiated by another task that is being run by the processor 204. The processor 204 may determine that there is such a high priority task HPT by determining that there is a task needing execution by the processor 204 that has a higher priority than the current task CT. Alternatively, the processor 204 may determine that there is such a high priority task HPT by determining that there is a task needing execution by the processor 204 that has a higher priority than the next task NT.

If, as is shown in FIG. 4b, the time 454 when the processor 204 detects that the high priority task HPT needs to be executed occurs after the time 452 of commencement of the transfer of the data 300 associated with the next task NT from the external memory 202 to the internal memory 208, then this data transfer is not interrupted. Rather, the data transfer is allowed to complete so that, after the processor 204 has completed the execution of the current task CT at a time 456, the processor 204 begins execution of the next task NT at a time 458.

At the time 458, a two-stage data transfer process is commenced, i.e. the processed data 300 associated with the current task CT is transferred from the internal memory 208 to the external memory 202, following which the data 300 associated with the high priority task HPT is transferred from the external memory 202 to the internal memory 208.

Thus, after the processor 204 has completed the execution of the next task NT at a time 460, the processor 204 may begin execution of the high priority task HPT at a time 462.

However, if, as is shown in FIG. 4c, the time 454 when the processor 204 detects that the high priority task HPT needs to be executed occurs earlier than the time 452 of commencement of the transfer of the data 300 associated with the next task NT from the external memory 202 to the internal memory 208, then this data transfer is not performed. Instead, the data 300 associated with the high priority task HPT is transferred from the external memory 202 to the internal memory 208.

Thus, after the processor 204 has completed the execution of the current task CT at the time 456, the processor 204 may begin execution of the high priority task HPT at a time 464.

The processor 204 may be arranged to execute the next task NT after the high priority task HPT.

In this way, the processor 204 schedules a next task NT for execution after it has executed (or completed) a current task CT. If, however, during execution of the current task CT, the processor 204 determines that a high priority task HPT needs to be executed, the processor 204 determines whether it has begun the data transfer from the external memory 202 to the internal memory 208 of the data 300 associated with the next task NT. If this transfer has not begun, then the processor 204 schedules the high priority task HPT for execution after the current task CT (and may schedule the next task NT for execution after the high priority task HPT); otherwise, the processor 204 schedules the high priority task HPT for execution after the next task NT, with the next task NT being executed after the current task CT. This avoids unnecessary stalling of the CPU 206 and increases the number of tasks that can be performed in a given period of time.

It will be appreciated that this scheduling method can be applied to a variety of systems that execute multiple tasks and that the scheduling method is not restricted to use in the data processing apparatus 100.

However, this scheduling method is particularly suited to the data processing apparatus 100 and the tasks that it performs for the various communication paths that it handles. In particular, the scheduling method is especially suited to data processing apparatus 100 for which the time to perform the two-stage data transfer process is comparable to the time required for the processor 204 to execute a task.

Additionally, this scheduling method is particularly suited to tasks which have soft real-time constraints, i.e. for a task which has a deadline by which it ought to be executed, but for which missing the deadline is not serious or fatal due to there being a mechanism for recovering from missing the deadline. Media processing tasks often have such soft real-time constraints, as concealment algorithms exist for media data (for example, a decoder can "fill-in" missing data in a real-time audio or video stream). Thus, this scheduling method is particularly suited to the communication system shown in FIG. 1, as the data processing apparatus 100 execute such media processing tasks.

The tasks executed by the processor 204 of the data processing apparatus are generally periodic, i.e. are to be executed repeatedly (e.g. every 10 ms or 20 ms). The periodicity of a task refers to the desired period of time between successive executions of the task (e.g. 10 ms or 20 ms), although in practice this may not be achieved. Therefore, for each task, there is a deadline by which that task should be executed although, as mentioned above, these deadlines are soft-deadlines and can therefore be missed. Examples of the tasks include voice processing tasks, fax processing tasks and modem processing tasks, and these tasks may involve data processing such as echo cancelling, media encoding and data compression.

Figure 5:
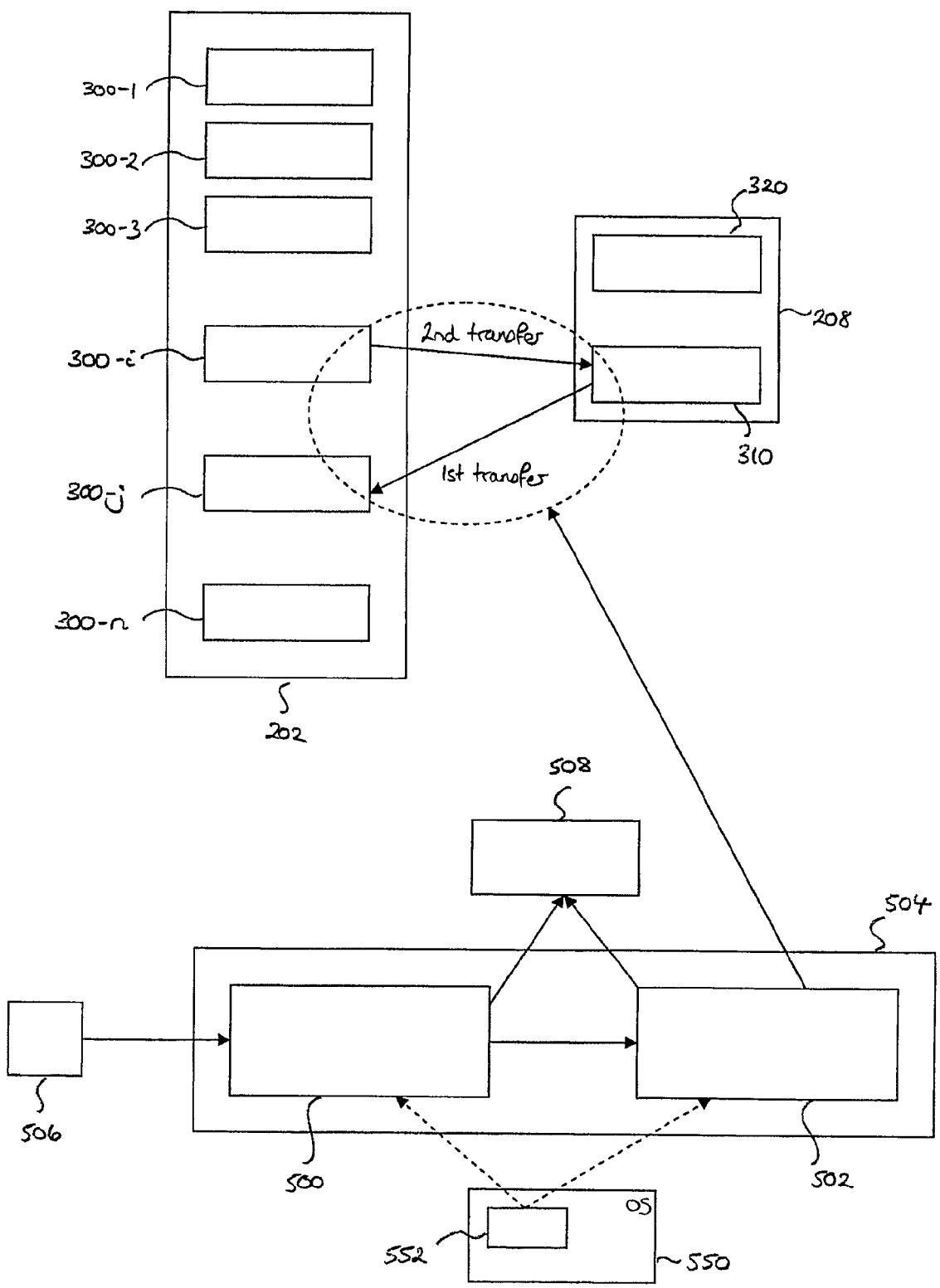
FIG. 5 schematically illustrates the way in which the processor illustrated in FIG. 2 is adapted to handle periodic tasks.

The way in which the processor 204 is adapted to handle these periodic tasks is schematically illustrated in FIG. 5. The CPU 206 of the processor 204 runs an operating system 550 that controls the overall execution of the tasks, memory management, etc. This operating system 550 may be a real-time operating system. The operating system 550 has a scheduler 552 for scheduling execution of various tasks according to their priority. In embodiments of the invention, a periodic task 500 (implemented as a periodic software interrupt 500 or as a periodic module 500) and a task execution task 502 (implemented as a task execution module 502) are provided. These are scheduled by the scheduler 552 of the operating system 550 and are executed by the operating system 550.

Together the periodic module 500 and the task execution module 502 form a second task scheduler 504 according to an embodiment of the invention. The task scheduler 504 schedules and controls the execution of the various tasks associated with the communication paths that the data processing apparatus 100 is handling (which shall be referred to a communication path tasks). The scheduling of the communication path tasks is not handled by the scheduler 552 of the operating system 550. In this way, the task scheduler 504, in the form of the periodic module 500 and the task execution module 502, may be provided to the operating system 550 as a "plug-in" for a standard operating system 550, so that a standard operating system 550 may be used rather than one which is specifically designed to handle the specific nature of the communication path tasks.

The periodic task 500 is scheduled by the scheduler 552 of the operating system 550 as a software interrupt or as a high priority task. The task execution task 502 is scheduled by the scheduler 552 of the operating system 550 as a low priority task. In preferred embodiments, the task execution task 502 has the lowest priority of all of the tasks executed by the processor 204.

The processor 204 stores control data related to the various communication path tasks in a task memory 508. This task memory 508 may form part of the internal memory 208 or may be a separate memory of the processor 204, for example an array of registers. The task memory 508 stores details of which tasks are currently required for the various communication paths being handled by the data processing apparatus 100. In particular, the task memory 508 stores, for each communication path task, the particular periodicity of that task and the time when that task was last executed, or alternatively, the time until the task next needs executing. Additionally, the task memory 508 stores, for each communication path task, an "active-flag" indicating whether that task is "active", i.e. whether, according to the periodicity of that task, that task needs to be executed at that particular point in time. The task memory 508 also stores a flag "Active-tasks-in-the-system-flag" which indicates whether there are currently any active tasks.

The periodic task 500 is executed periodically. Therefore, the processor 204 has a time-division-multiplex unit or a hardware timer 506 which periodically triggers the execution of the periodic task 500, although it will be appreciated that other methods may be used to periodically execute the periodic task 500. The timer 506 therefore determines a series of scheduling time points at which the periodic task 500 is executed. The periodicity of the periodic task 500 (i.e. the time between successive signals from the timer 506) is the greatest common divisor of all of the periodicities of all of the possible communication path tasks. For example, the possible periodicities of the communication path tasks may be 20 ms, 30 ms and 50 ms. In this case, the periodicity for the periodic task 500 will be 10 ms, i.e. the periodic task 500 is to be executed every 10 ms. Note that at a given point in time, there may not be a communication path being handled which has an associated task with the periodicity of the periodic task 500.

The periodicities of tasks may be stored in the task memory 508 as actual time values or as multiples of the periodicity of the periodic task 500 or via any other suitable method.

In contrast to the periodic task 500, the task execution task 502 is executed as a continuous endless loop.

Details of the processing performed by both the periodic task 500 and the task execution task 502 will be given later.

Figure 6:
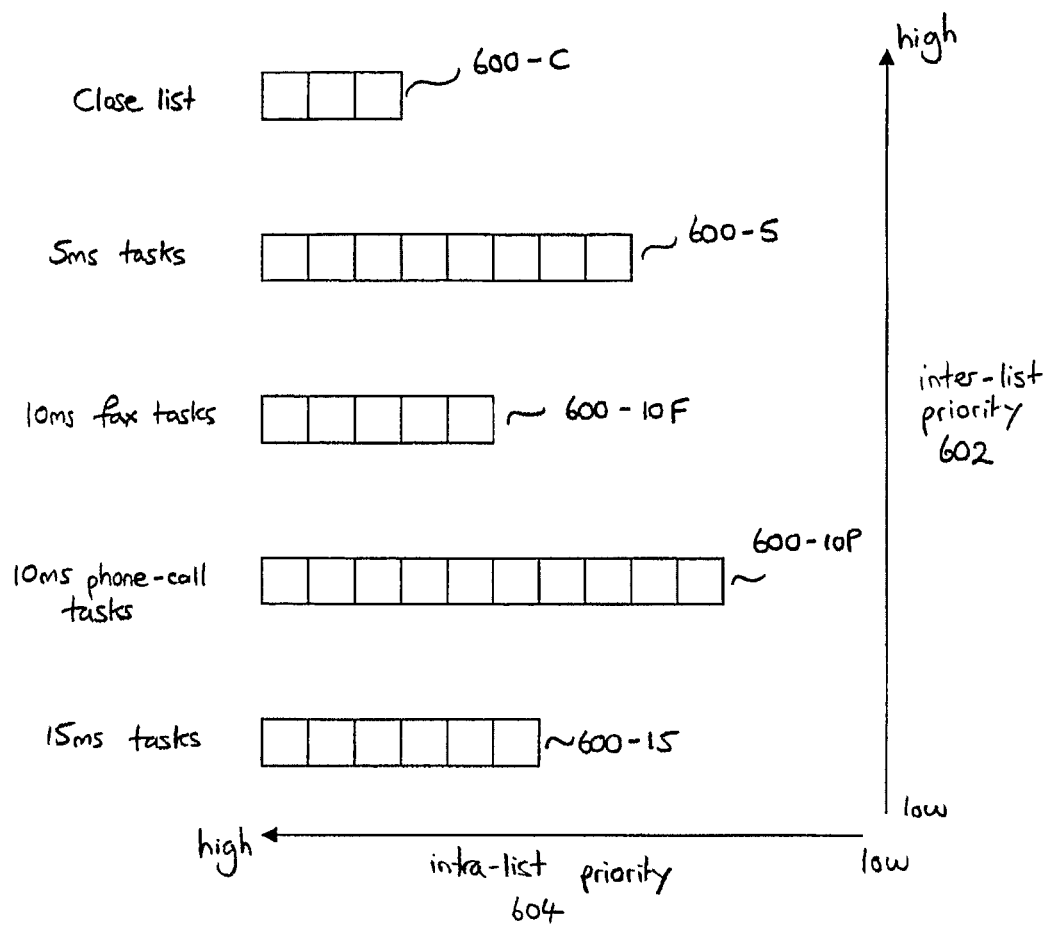
FIG. 6 schematically illustrates the arrangement of task priorities according to an embodiment of the invention.

FIG. 6 schematically illustrates the arrangement of task priorities according to an embodiment of the invention. As is shown in FIG. 6, the periodic task 500 groups the communication path tasks into a number of priority lists 600. In FIG. 6, there is a priority list 600-C representing the tasks that are associated with a communication path that has just been closed (as described above, the control module 212 informs the processor 204 when a communication path has been closed). There are also priority lists 600-5, 600-10F, 600-10P, 600-15 which represent, respectively, the communication path tasks that (i) have a periodicity of 5 ms; (ii) have a periodicity of 10 ms and relate to fax communications; (iii) have a periodicity of 10 ms and relate to telephone call communications; and (iv) have a periodicity of 15 ms. Indeed, the periodic task 500 has a priority list 600 for each of the possible task periodicities (those shown in FIG. 6 being merely exemplary). However, there may be multiple priority lists 600 for a given periodicity (such as the priority lists 600-10F and 600-10P), with the communication path tasks of that given periodicity be allocated to a particular list in accordance with the type of task or type of processing to be performed (such as processing for fax communications, processing for modem communications and processing for telephone calls).

The priorities associated with the communication path tasks are then as follows: tasks in the priority list 600-C representing tasks that are to be closed have a higher priority than tasks in all other priority lists 600. This allows efficient and speedy closure of communication paths when required. For the communication path tasks that are not to be closed, a first task has a higher priority than a second task if the first task has a shorter periodicity than the second task. For example, a 5 ms periodic task has a higher priority than a 10 ms periodic task, whilst a 10 ms periodic task has a higher priority than a 15 ms periodic task. Additionally, a first task with the same periodicity as a second task may have a higher priority that the second task if it is in a different priority list 600. For example, communication path tasks in the priority list 600-10F have a higher priority than the communication path tasks in the priority list 600-10P, despite having the same periodicity. This is illustrated in FIG. 6 by an inter-list priority arrow 602.

Furthermore, the ordering of the tasks within a priority list 600 provides the relative priority of those tasks with that priority list 600. This is illustrated in FIG. 6 by an intra-list priority arrow 604.

In general, if a voice processing task (i.e. one relating to a telephone call) and a data processing task (i.e. one relating to a facsimile transmission or modem communication) share the same periodicity, then the data processing task is given a higher priority than the voice processing task (as is illustrated in FIG. 6 by the priority list 600-10F being higher than the priority list 600-10P in the inter-list priority 602). The reason for this is that missing a soft-deadline for a telephone call causes a user 104 less inconvenience and is less noticeable to the user 104 than missing a soft-deadline for a data processing task.

It will be appreciated, however, that other priority orderings could be used for the various tasks, and that the priorities shown in FIG. 6 are merely exemplary. Additionally, the actual use of separate priority lists 600 is purely illustrative and the processor 204 need not maintain such separate priority lists 600. Indeed, the processor 204 could simply allocate a priority number to each task and store that priority number in the task memory 508.

Figure 7:
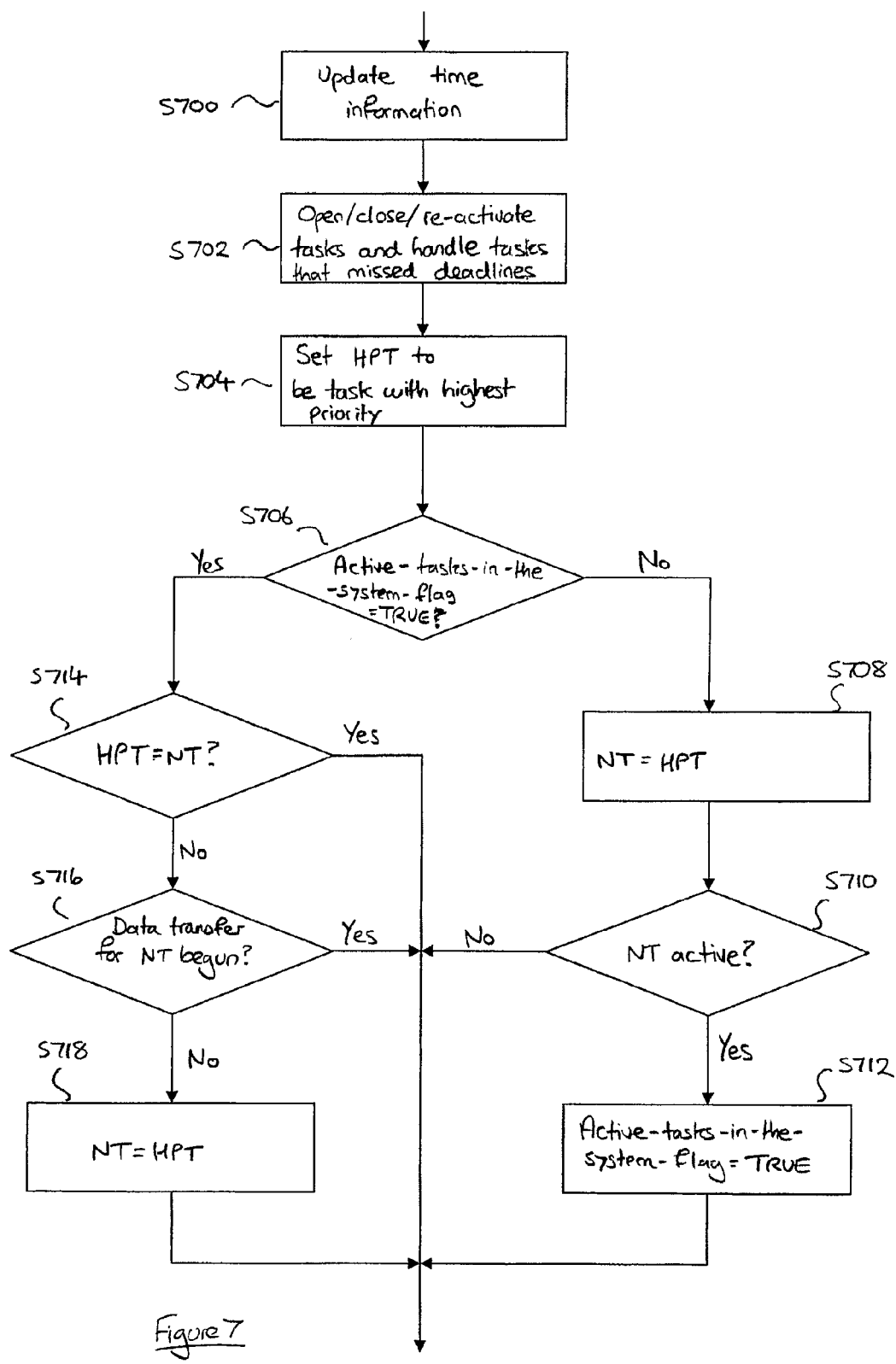
FIG. 7 is a flowchart illustrating the processing performed by a periodic task according to an embodiment of the invention.

FIG. 7 is a flowchart illustrating the processing performed by the periodic task 500 according to an embodiment of the invention. When the periodic task 500 is initiated in accordance with a signal from the timer 506, the periodic task begins at a step S700, at which it updates time information. The periodic task 500 stores time information so that it can determine, for example, whether any of the communication path tasks are due to be executed. The periodic task 500 may use information provided to it by the timer 506. Alternatively, the periodic task 500 may simply maintain a count of the number of times it has been executed.

At a step S702 the periodic task 500 performs a number of operations, as described below.

If a new communication path is to be established, then the periodic task 500 opens a new communication path task suitable for that communication path. The new communication path task is added to the priority list 600 which corresponds to the new communication path task.

If an existing communication path is to be closed, then the task associated with that communication path is moved to the priority list 600-C for tasks that are to be closed, i.e. the priority for this task is updated.

The periodic task 500 determines which tasks are due for execution and therefore need to be activated. The periodic task 500 will activate all of the communication path tasks in a given priority list 600 at the same time. The periodic task 500 determines whether to activate the communication path tasks in a priority list 600 by comparing the time between the last activation of those tasks and the current time. If this is equal to the periodicity associated with that priority list 600, then the communication path tasks in that priority list 600 need to be executed and the periodic task 500 activates them, i.e. sets the active-flag for those communication path task as active.

Finally, the periodic task 500 determines whether there are any communication path tasks that have missed a deadline for execution, i.e. identifies unexecuted tasks which had been scheduled for execution but which have not yet been executed. The processing performed by the periodic task 500 for determining whether there are any communication path tasks that have missed a deadline for execution and the processing performed by the periodic task 500 when such a task is detected will be described in more detail later.

At a step S704, the periodic task 500 identifies, from the priority lists 600, a task HPT having the highest priority. If there are tasks that are currently active, the periodic task 500 identifies the highest priority task HPT from only the active tasks; otherwise, the periodic task 500 identifies the highest priority task HPT from all of the communication path tasks.

At a step S706, the periodic task 500 tests the value of the flag Active-tasks-in-the-system-flag. If the flag Active-tasks-in-the-system-flag is false, then processing continues at a step S708; otherwise, processing continues at a step S714.

At the step S708, the next task NT is set to be the highest priority task HPT. Then, at a step S710, a test is performed to check whether the next task NT is currently active. If the next task NT is not active, then the processing for the current period of the periodic task 500 is complete. Otherwise processing continues at a step S712 at which the flag Active-tasks-in-the-system-flag is set to be true, following which the processing for the current period of the periodic task 500 is complete.

At the step S714, the periodic task 500 determines whether the highest priority task HPT is actually the next task NT that is currently scheduled for execution after execution of the current task CT. If the next task NT is actually the highest priority task HPT, then the processing for the current period of the periodic task 500 is complete. Otherwise, processing continues at a step S716.

At the step S716, the periodic task 500 determines whether the transfer of the data 300 for the next task NT from the external memory 202 to the internal memory 208 has begun. For example, if the data transfers are performed by a DMA process, the processor 204 may be arranged to determine (or retrieve) the status of the DMA process. The processor 204 may then stop the data transfer in dependence on the status of the DMA process, as has been described with reference to FIGS. 4*b* and 4*c*.

If the data transfer has begun, then the processing for the current period of the periodic task 500 is complete. Otherwise, processing continues at a step S718 at which the next task NT is set to be the highest priority task HPT, following which the processing for the current period of the periodic task 500 is complete. In this way, the periodic task 500 performs part of the task scheduling illustrated in FIGS. 4*b* and 4*c*.

Figure 8:
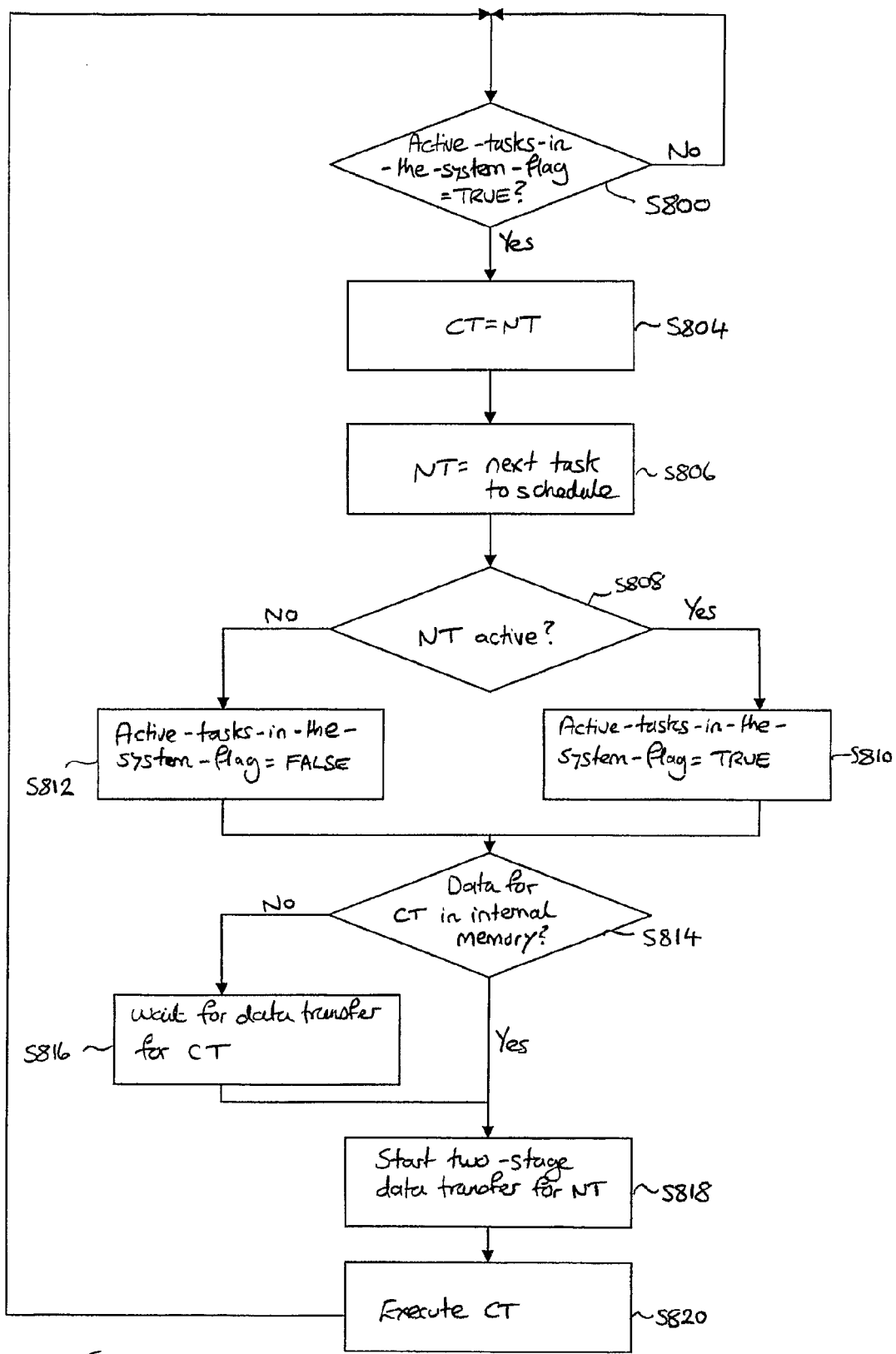
FIG. 8 is a flowchart illustrating the processing performed by a task execution task according to an embodiment of the invention.

FIG. 8 is a flowchart illustrating the processing performed by the task execution task 502 according to an embodiment of the invention. At a step S800, the task execution task 502 determines whether the flag Active-tasks-in-the-system-flag is set to true (for example, having been set to true by the periodic task 500 at the step S712 shown in FIG. 7). If the value of the flag Active-tasks-in-the-system-flag is false, then processing loops back to the step S800. Otherwise, processing continues at a step S804. In this way, the task execution task 502 waits for the Active-tasks-in-the-system-flag to be set to true.

At the step S804, the current task CT is set to be the next task NT, following which, at a step S806, the next task NT is set to be the next task to schedule for execution. The next task to schedule is the highest priority communication path task out of all of the active communication path tasks which have a lower priority that the current task CT. If no such communication path task exists, then the next task to schedule is set to be the highest priority communication path task out of all of the communication path tasks which the periodic task 500 will next activate. Thus, the next task NT need not be active.

At a step S808, the task execution task 502 determines whether the next task NT is active. If the next task NT is active, then processing continues at a step S810 at which the flag Active-tasks-in-the-system-flag is set to be true; otherwise, processing continues at a step S812 at which the flag Active-tasks-in-the-system-flag is set to be false.

Processing then continues at a step S814 at which the task execution task 502 determines whether the data transfer of the data 300 for the current task CT from the external memory 202 to the internal memory 208 has been completed. If this data transfer has not been completed, then processing continues at a step S816 at which the task execution task 502 waits for this data transfer to complete.

Once the data transfer for the current task CT has been completed, processing continues at a step S818 at which the two-stage data transfer process described above for the next task NT is commenced. This is done regardless of whether the next task NT is active. In this way, even if the next task NT is not active, the data 300 associated with it is transferred into the internal memory 208. This helps improve the efficiency of the data processing apparatus 100.

At a step S820, the task execution task 502 instructs the processor 204 to begin execution of the current task CT. Once the current task CT has been executed, the current task CT is set to be inactive and the task execution task 502 returns to the step S800 at which it waits for the Active-tasks-in-the-system-flag to be set to true.

In this way, the task execution task 502, together with the periodic task 500, perform the non-pre-emptive scheduling illustrated in FIGS. 4*a* and 4*b*.

It will be appreciated that other scheduling methods may be implemented by the task execution task 502 and the periodic task 500. Consider, for example, the case where the data transfers are performed by a DMA process. If the processor 204 is not able to determine (or retrieve) the status of a DMA data transfer and/or if the processor 204 is not able to stop a DMA data transfer which is currently in progress, then the steps S716 and S718 may not be implemented. This means that the processor 204 would not check whether the transfer of the data 300 for the next task NT from the external memory 202 to the internal memory 208 has begun and would not stop it if it had begun in order to change which task is to be executed next. This would result in the next task NT being executed before the high priority task HPT, regardless of the status of the data transfers for the next task NT.

It will be appreciated that each communication path task has a deadline for execution, this deadline being dependent on the periodicity of that task. For example, a task with a 15 ms periodicity is activated by the periodic task 500 every 15 ms. The periodic task 500 may itself have a periodicity of 5 ms. Once the periodic task 500 has activated the 15 ms communication path task, then the 15 ms communication path task may not actually be executed within the next 5 ms. This could be due to there being a large number of higher priority tasks that need to be executed. However, when the periodic task 500 is next executed, it may activate other communication path tasks and some of these may have a higher priority than the 15 ms communication path task. These newly activated communication path tasks will therefore be executed before the 15 ms periodic communication path task. In this way, the 15 ms periodic communication path task may miss its deadline.

As mentioned above, the periodic task 500 may detect when a communication path task has missed its deadline and may then perform some additional processing for that task. In particular, at the step S702 of FIG. 7, the periodic task 500 may determine whether there are any communication path tasks that have missed their deadline by comparing the periodicity of each communication path task with the time since that communication path task was last re-activated.

For a communication path task that has missed its deadline, the periodic task 500 instructs the processor 204 to perform a number of processing steps. In particular, the processor 204 performs, for each communication path task that has missed its deadline, any steps/functions deemed essential to that task, such as (i) updating a time-dependent variable; (ii) updating a variable that is dependent on a number of scheduling time points that have passed; and (iii) updating task statistics. These steps are performed so as to ensure that the data 300 for the communication path tasks is up-to-date.

Additionally, for a task that has missed its deadline, the priority of that task is updated by increasing it. This is done by moving that task within its priority list 600 along the direction of the intra-list priority arrow 604 so that the task that missed its deadline occurs before those tasks in the priority list 600 that were executed. For example, a task that has missed its deadline could be simply moved to the top of its priority list 600.

It will be appreciated that, insofar as embodiments of the invention are implemented by a computer program, then a storage medium and a transmission medium carrying the computer program form aspects of the invention.

Embodiments of an aspect of the invention are particularly suited to tasks, such as media processing tasks, for which the time taken to execute a task is comparable to the time taken to load data for a task into the memory of a processor. This is because the loading of the data into the processor memory is not interrupted, which may otherwise easily cause the processor to stall. This therefore increases the number of tasks that can be executed per unit time (i.e. increases the task density).

Embodiments of an aspect of the invention is particularly suited to tasks, such as media processing tasks, that are to be executed periodically and which have soft real-time constraints. This is because, over a period of time, the priorities of the tasks may be updated to reflect how the processor has been executing the tasks. As such, worst case scenarios for the processing do not need to be catered for—rather, the statistically average scenario can be assumed.

The invention claimed is:

1. A method of scheduling execution of a plurality of tasks by a processor, the processor having a processor memory, the processor being arranged to load into the processor memory, during execution of a current task, data for execution of a task that is scheduled for execution after the processor has completed the current task, the method comprising:

executing by the processor a current task;
scheduling a next task for execution by the processor;
after scheduling the next task, determining whether there is a high priority task to be executed by the processor; and
if there is a high priority task to be executed by the processor:
  determining whether the processor has begun loading data for execution of the next task into the processor memory;
  if the processor has not begun loading the data for execution of the next task into the processor memory, scheduling the high priority task, instead of the next task, for execution by the processor after the processor has completed the current task; and
  if the processor has begun loading the data for execution of the next task into the processor memory, maintaining the next task as scheduled for execution after the processor has completed the current task.

2. A method according to claim 1, in which each task of the tasks has an associated priority and determining whether there is a high priority task comprises determining whether there is a task having a higher priority than the next task.

3. A method according to claim 1, wherein:
the loading into the processor memory of the data for execution of the task that is scheduled for execution after the processor has completed the current task is by a direct-memory-access process.

4. The method of claim 1, wherein;
the processor has a first buffer and a second buffer;
data for execution of the current task is stored in the first buffer; and
the data for execution of the next task is stored in the second buffer.

5. The method of claim 1, further comprising if the processor maintains the next task as scheduled for execution after the processor has completed the current task, beginning execution of an auxiliary operation of the high priority task before the processor has completed execution of the next task, wherein the auxiliary operation of the high priority task is selected from a group consisting of:
updating a time-dependent variable;
updating a variable that is dependent on a number of scheduling time points that have passed for the unexecuted task; and
updating task statistics.

6. The method of claim 1, wherein:
the plurality of tasks comprises a plurality of periodic tasks; and
the method further comprises:
  adopting a method of scheduling non-periodic tasks,
  determining whether a task is periodic; and
  if the task is determined to be non-periodic, scheduling the task by the adopted method of scheduling non-periodic tasks.

7. The method of claim 6, wherein:
determining whether a task is periodic comprises determining that task management tasks are non-periodic; and
the method further comprises assigning a lowest priority to task management tasks.

8. The method of claim 1, wherein determining that there is a high priority task is not based upon whether the processor has begun loading the data for execution of the next task into the processor memory.

9. The method of claim 1, further comprising scheduling the high priority task for execution after the processor has completed the next task if the processor has begun loading the data for execution of the next task into the processor memory.

10. An apparatus for scheduling execution of a plurality of tasks by a processor, the apparatus comprising:
the processor, having a processor memory, to execute a current task and to load into the processor memory, during execution of a current task, data for execution of a next task, wherein the scheduled execution of the next task is after the completion of the current task;
a scheduler to schedule the next task for execution by the processor and to determine, after scheduling the next task for execution, whether there is a high priority task to be executed by the processor, wherein the scheduler, if there is a high priority task to be executed by the processor, is to:
determine whether the processor has begun loading the data for execution of the next task into the processor memory;
if the processor has not begun loading the data for execution of the next task into the processor memory, to schedule the high priority task, instead of the next task, for execution by the processor after the processor has completed the current task; and
if the processor has begun loading the data for execution of the next task into the processor memory, to maintain the next task as scheduled for execution after the processor has completed the current task.

11. An apparatus according to claim 10, in which the scheduler, if there is a high priority task to be executed by the processor and if the processor has begun loading the data for execution of the next task into the processor memory, to schedule the high priority task for execution after the processor has completed the next task.

12. An apparatus according to claim 10, in which each task of the tasks has an associated priority and the scheduler is to determine whether there is a high priority task by determining whether there is a task of the tasks having a higher priority than the next task.

13. The apparatus of claim 10, wherein:
the processor memory has a first buffer and a second buffer;
data for execution of the current task is stored in the first buffer; and
the data for execution of the next task is stored in the second buffer.

14. The apparatus of claim 10, wherein the loading data for execution of the next task into the processor memory during execution of the current task is loading by a direct-memory-access process.

15. The apparatus of claim 10, wherein, if the processor maintains the next task as scheduled for execution after the processor has completed the current task, the processor is further to begin execution of an auxiliary operation of the high priority task before the processor has completed execution of the next task, wherein the auxiliary operation of the high priority task is selected from a group consisting of:
updating a time-dependent variable;
updating a variable that is dependent on a number of scheduling time points that have passed for the unexecuted task; and
updating task statistics.

16. The apparatus of claim 10, wherein:
the plurality of tasks comprises a plurality of periodic tasks and a plurality of non-periodic tasks; and
the scheduler is to:
adopt a method of scheduling non-periodic tasks,
determine whether a task is periodic; and
if the task is determined to be non-periodic, schedule the task by the adopted method of scheduling non-periodic tasks.

17. The apparatus of claim 16, wherein:
determining whether a task is periodic comprises determining that task management tasks are non-periodic; and
the scheduler is to assign a lowest priority to task management tasks.

18. A non-transitory computer-readable medium comprising a plurality of instructions to manipulate one or more processors on one or more computing devices, the plurality of instructions comprising:
instructions to execute a current task by a processor of the one or more processors;
instructions to schedule a next task for execution by the processor;
instructions to determine whether there is a high priority task to be executed by the processor, the determination to be made after the scheduling the next task;
instructions to determine whether the processor has begun loading data for execution of the next task into a memory of the processor memory, if there is a high priority task to be executed by the processor;
instructions to schedule the high priority task, instead of the next task, for execution by the processor after the processor has completed the current task if the processor has not begun loading the data for execution of the next task into the processor memory; and
instructions to maintain the next task as scheduled for execution after the processor has completed the current task if there is a high priority task to be executed by the processor and if the processor has begun loading the data for execution of the next task into the processor memory.

19. The computer-readable medium of claim 18, wherein:
the next task has a priority; and
determining whether there is a high priority task comprises determining whether there is a task having a higher priority than the next task.

20. The computer-readable medium of claim 18, further comprising instructions to begin execution of an auxiliary operation of the high priority task before the processor has completed execution of the next task, if the processor maintains the next task as scheduled for execution after the processor has completed the current task, wherein the auxiliary operation of the high priority task is selected from a group consisting of:
updating a time-dependent variable;
updating a variable that is dependent on a number of scheduling time points that have passed for the unexecuted task; and
updating task statistics.

* * * * *